F. J. CORNIL.
CHUCK.
APPLICATION FILED OCT. 4, 1911.
1,033,547.
Patented July 23, 1912.
2 SHEETS—SHEET 1.
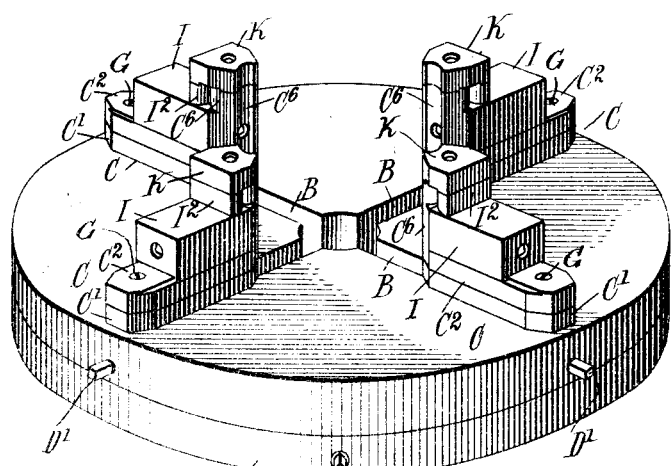
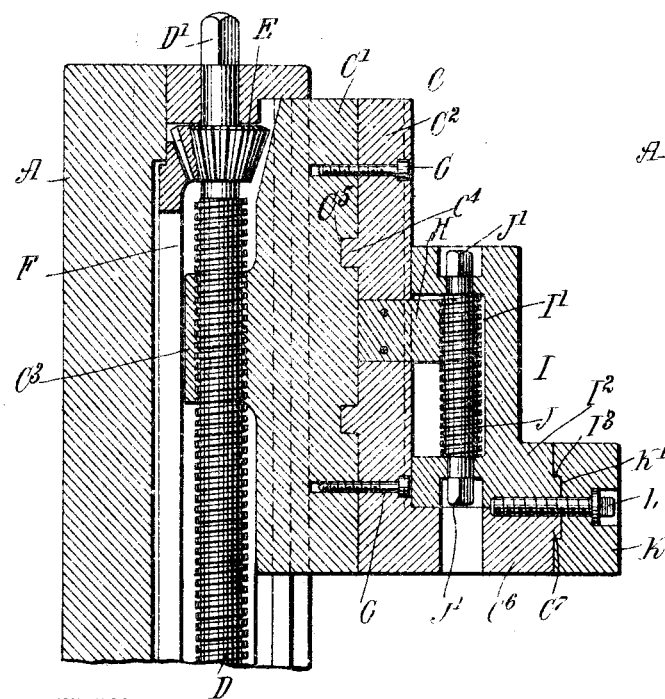
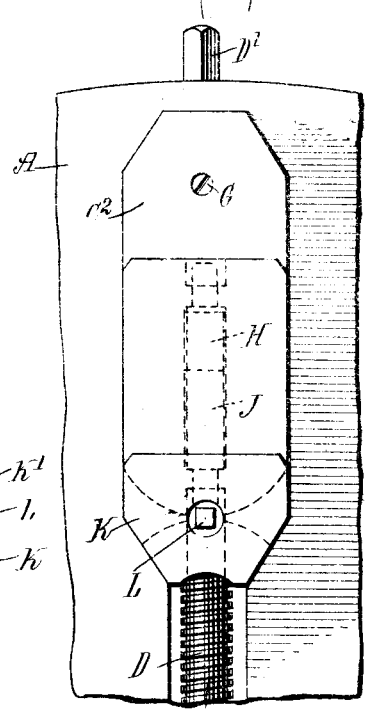
WITNESSES
INVENTOR
Frank J. Cornil
BY
ATTORNEYS

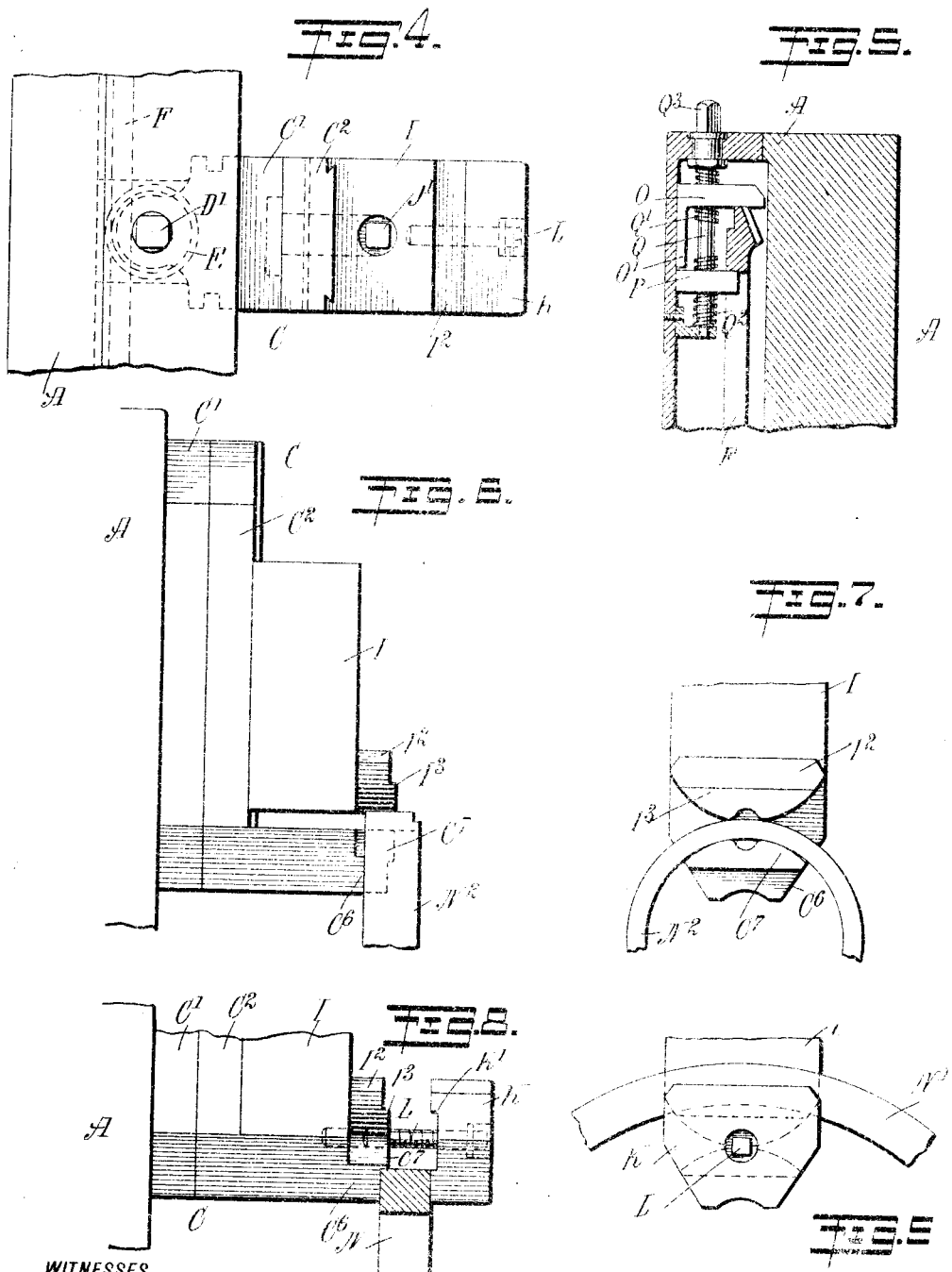

UNITED STATES PATENT OFFICE.

FRANK J. CORNIL, OF ARGENTA, ARKANSAS.

CHUCK.

1,033,547.  Specification of Letters Patent.  Patented July 23, 1912.

Application filed October 4, 1911. Serial No. 652,681

*To all whom it may concern:*

Be it known that I, FRANK J. CORNIL, a citizen of the United States, and a resident of Argenta, in the county of Pulaski and State of Arkansas, have invented a new and Improved Chuck, of which the following is a full, clear, and exact description.

The object of the invention is to provide a new and improved chuck for use on lathe, drill and boring machines and the like, and arrange to hold the work firmly and securely in place without danger of the work springing or becoming distorted while turning or boring the work, and to allow of quickly and conveniently changing the jaws and the members thereof for accommodating different kinds of work.

For the purpose mentioned use is made of main jaws mounted to slide radially in the usual manner on the face plate, each provided on its front face with an auxiliary jaw, and means for radially adjusting an auxiliary jaw on its main jaw.

A practical embodiment of the invention is represented in the accompanying drawings forming a part of this specification, in which similar characters of reference indicate corresponding parts in all the views.

Figure 1 is a perspective view of the chuck; Fig. 2 is an enlarged sectional side elevation of part of the same on the line 2—2 of Fig. 3; Fig. 3 is a face view of the same; Fig. 4 is a plan view of the same; Fig. 5 is a sectional side elevation of the locking device for the gear wheel controlling the main jaws on the face plate; Fig. 6 is a side elevation of part of the face plate and one of the main jaws and its auxiliary jaw holding the work clamped between the said jaws; Fig. 7 is a face view of the same; Fig. 8 is a side elevation of part of the face plate, one of the main jaws, its auxiliary jaw, and a clamping plate for holding the work between the main jaw and the clamping plate; and Fig. 9 is a face view of the same and showing the work clamped between the auxiliary jaw and the clamping plate.

The face plate A of the chuck is provided with the usual radial slots B, in which are mounted to slide radially the main jaws C, each formed of an inner section $C'$ and an outer or face section $C^2$, the inner section $C'$ being provided with a nut $C^3$ in which screws a screw rod D extending radially and mounted to turn in suitable bearings on the face plate A. The outer end $D'$ of the screw rod D is made polygonal for the application of a wrench or other tool, to permit of turning the screw rod D, and on the latter is secured a bevel gear wheel E in mesh with a gear wheel F mounted to turn in the face plate A, so that when one of the screw rods D of the chuck is turned, a rotary motion is transmitted by the corresponding pinion E to the gear wheel F to rotate the remaining screw rods in unison, thus shifting the jaws C inward or outward according to the direction in which a screw rod D is turned.

The outer section $C^2$ of each jaw C is reversibly held on the outer face of the section $C'$, and for this purpose use is made of screws G for fastening the sections $C^2$ and $C'$ together, the inner face of the outer section $C^2$ being also provided with lugs $C^4$ engaging corresponding recesses $C^5$ on the outer face of the section $C'$, to securely hold the section $C^2$ in position on the section $C'$. One end of the outer section $C^2$ is provided with a clamping lug $C^6$.

The outer section $C^2$ of each main jaw C is provided on its face with a projecting half nut H extending into a recess $I'$ formed in the back of an auxiliary jaw I, mounted to slide radially on the outer face of the section $C^2$, and the said half nut H is in mesh with a radially-disposed screw rod J mounted to turn in suitable bearings arranged on the auxiliary jaw I. The ends $J'$ of the screw rod J are made polygonal for the application of a wrench, to permit of turning the screw rod J from the outer end whether the auxiliary jaw I is reversed with the section $C^2$ or not. The auxiliary jaw I is provided with a lug $I^2$ normally abutting with its under face against the top of the top of the lug $C^6$, and the faces of the lugs $I^2$ and $C^6$ are preferably flush with each other. A clamping plate K is adapted to fit against the faces of the lugs $I^2$ and $C^6$, and a screw L engages the clamping plate K and screws in the joint of the lugs $I^2$ and $C^6$, as plainly indicated in Fig. 2. On turning the screw L outward, the clamping plate K can be spaced from the lugs $I^2$ and $C^6$ to permit of clamping the work N between the clamping plate K and the lug $C^6$ (see Fig. 8), or for clamping the work N' between the clamping plate K and the lug I², as indicated in Fig. 9. When the work N² is to be clamped between the lugs C⁶ and I² (see Figs. 6 and 7) then the operator turns the screw rod J to slide the auxiliary jaw I outwardly on the section C² until the lugs C⁶ and I² are the desired distance apart to accommodate the work N². It will be noticed that when the auxiliary jaw I is moved outward on turning the screw J as described, the lug I² moves away from the screw L so that the latter and the clamping plate K can be readily removed without screwing out the screw L from the lugs I² and C⁶. The inner face of the clamping plate K is preferably provided with a recess K' adapted to be engaged by offsets C⁷ and I³ formed on the faces of the lugs I² and C⁶, so as to securely hold the clamping plate K normally in position on the faces of the lugs I² and C⁶. When the lugs I² and C⁶ are used for clamping purposes as above described, it is only necessary to retard the screw slightly to disengage the recess K' from the offsets I³ and C⁷, to allow of moving the auxiliary jaw I outward, as above explained, so that the lugs I³ and C⁷ clear the inner face of the clamping plate K.

In order to permit of locking the screw rods D in a desired position, use is made of a locking device consisting essentially of locking plates O and P, adapted to engage the outer and inner edges of the rim of the gear wheel F, as plainly indicated in Fig. 5. The locking plates O and P are engaged by the right and left hand screw threads Q' and Q² of a screw rod Q, mounted to turn in suitable bearings in the face plate A, the outer end Q³ of the screw rod Q being made polygonal for the application of a wrench or other tool to allow turning of the screw rod Q with a view to move the clamping plates O and P toward each other and into clamping contact with the rim of the gear wheel F, or from each other out of clamping contact with the rim of the said gear wheel. The clamping plate O is provided with a flange O' fitting against the face plate A so as to guide the clamping plate O in its inward or outward movement, the clamping plate P being likewise in engagement with the face plate A for guiding the said clamping plate in its inward or outward movement. The flange O' also serves as a clamping block when the clamping plates O and P are closed or in closed position on the rim of the gear wheel F.

By furnishing the faces of the lugs I², C⁶ with square offsets I³, C⁷ the work can be abutted against the shoulders of the offsets I³, C⁷ (see Fig. 8), and then the work can be accurately positioned prior to finally clamping it in place between the lugs I², C⁶ and the clamping plate K. It will also be noticed that by the arrangement described the work is firmly held in position, thus reducing the danger of springing or distortioning to a minimum.

It is understood that when it is desired to use the jaws in reverse position from the one shown in the drawings, it is only necessary for the operator to unscrew the bolts G for the removal of the outer section C² of the jaw C from the inner section C', and then the operator can reverse the section C² with the parts carried thereon left undisturbed, after which the section C² is replaced on the section C' and again fastened thereto by the screws G.

It is further understood that the main jaws C and the parts carried thereby can be readily adjusted in a radial direction on the face plate A, the auxiliary jaws I can be independently adjusted on the main jaws C (see Figs. 6 and 7), and the clamping plate K can be independently adjusted relative to the lugs I², C⁶ at the time the lug I² is seated on the lug C⁶, as shown in Figs. 2, 8 and 9.

The chuck is especially serviceable for accurately turning or boring packing rings and the like.

Having thus described my invention, I claim as new and desire to secure by Letters Patent:

1. A chuck, comprising a face plate having radial slots, main jaws slidably mounted in the said slots and provided with clamping lugs, and auxiliary jaws mounted to slide radially on the front face of the said main jaws and provided with clamping lugs normally abutting the clamping lugs of the said main jaws.

2. A chuck, comprising a face plate having radial slots, main jaws slidably mounted in the said slots and provided with clamping lugs, auxiliary jaws mounted to slide radially on the front faces of the said main jaws and provided with clamping lugs normally abutting the clamping lugs of the main jaws, and clamping plates held on the front faces of the clamping lugs of said main and auxiliary jaws.

3. A chuck, comprising a face plate having radial slots, main jaws slidably mounted in the said slots and each provided at one end with a clamping lug, auxiliary jaws mounted to slide radially on the front faces of the said main jaws and provided with clamping lugs normally engaging the clamping lugs of the main jaws, clamping plates on the front faces of the clamping lugs of said main and auxiliary jaws, and bolts engaging the said clamping plates and screwing in the joints between the clamping lugs of the main and auxiliary jaws.

4. A chuck, comprising a face plate having radial slots, main jaws slidably mounted in the said slots and each consisting of outer and inner sections, of which the outer section is reversibly mounted on the outer face of the inner section, fastening means arranged to hold the sections together in either position, and auxiliary jaws mounted to slide on the outer sections of the said main jaws.

5. A chuck, comprising a face plate having radial slots, main jaws slidably mounted in the said slots and each consisting of outer and inner sections, of which the outer section is reversibly mounted on the outer face of the inner section, and an auxiliary jaw mounted to slide radially on the outer section of a main jaw, to allow of clamping the work between the outer section of the main jaw and the said auxiliary jaw.

6. A chuck, comprising a face plate having radial slots, main jaws slidably mounted in the said slots and each consisting of outer and inner sections, of which the outer section is reversibly mounted on the outer face of the inner section, and is provided with an integral clamping lug, and an auxiliary jaw mounted to slide radially on the said outer section of a main jaw to co-act with the clamping lug of the outer section for clamping the work between the auxiliary jaw and the clamping lug.

7. A chuck, comprising a face plate having radial slots, main jaws slidably mounted in the said slots and each consisting of outer and inner sections, of which the outer section is reversibly mounted on the outer face of the inner section and is provided with an integral clamping lug, and an auxiliary jaw mounted to slide radially on the said outer section of a main jaw and provided with a clamping lug, the faces of the said clamping lugs being flush.

8. A chuck, comprising a face plate having radial slots, main jaws slidably mounted in the said slots and each consisting of outer and inner sections, of which the outer section is reversibly mounted on the outer face of the inner section and is provided with an integral clamping lug, an auxiliary jaw mounted to slide radially on the said outer section of a main jaw and provided with a clamping lug, the faces of the said clamping lugs being flush, a clamping plate fitting onto the said flush faces, and a screw engaging the said clamping plate and screwing in the joint of the said lugs.

9. A chuck, comprising a face plate having radial slots, main jaws slidably mounted in the said slots and each provided at one end with a clamping lug, auxiliary jaws mounted to slide radially on the front faces of the said main jaws, the said auxiliary jaws being provided with clamping lugs normally engaging the clamping lugs of the main jaws, a half nut on each of the said main jaws, and a radially-disposed screw mounted to turn on each of the said auxiliary jaws and engaging the corresponding nut, the screw having polygonal heads in each end to permit of turning the screw from either end.

10. A chuck, comprising a face plate having radial slots, main jaws slidably mounted in the said slots, and each consisting of outer and inner sections, of which the outer section is reversibly mounted on the outer face of the inner section and is provided with an integral clamping lug, an auxiliary jaw mounted to slide radially on the said outer section of a main jaw and provided with a clamping lug, the faces of the said clamping lugs being flush, a clamping plate fitting onto the said flush faces, and a screw engaging the said clamping plate and screwing in the joint of the said lugs, the abutting faces of the said lugs and clamping plates being provided one with a recess and the other with an offset engaging the recess.

11. A chuck, comprising a face plate having radial slots, jaws mounted to slide in the said slots, a gear wheel mounted to turn and connected with the said jaws to move the same simultaneously on the face plate, and a locking device comprising locking plates for engaging the outer and inner edges of the rim of said gear wheel.

12. A chuck, comprising a face plate having radial slots, jaws mounted to slide in the said slots, a gear wheel mounted to turn and connected with the said jaws to move the same simultaneously on the face plate, a locking device for the said gear wheel, and comprising two locking plates for engaging the outer and inner edges of the rim of the gear wheel, and a screw rod mounted to turn on the face plate and having right and left hand screw threads screwing in the said locking plates.

In testimony whereof I have signed my name to this specification in the presence of two subscribing witnesses.

FRANK J. CORNIL.

Witnesses:
 L. VANN,
 WM. HOROWITZ.